United States Patent [19]

Kamin, Jr. et al.

[11] Patent Number: 5,825,762
[45] Date of Patent: Oct. 20, 1998

[54] APPARATUS AND METHODS FOR PROVIDING WIRELESS COMMUNICATION TO A SECTORIZED COVERAGE AREA

[75] Inventors: Ralph A. Kamin, Jr.; Graham Haddock, both of Bedford, Tex.

[73] Assignee: Motorola, Inc., Schaumburg, Ill.

[21] Appl. No.: 718,838

[22] Filed: Sep. 24, 1996

[51] Int. Cl.$^6$ ................................................ H04B 7/216
[52] U.S. Cl. ........................ 370/335; 342/373; 455/562
[58] Field of Search ................................... 370/320, 335, 370/342, 328; 375/200; 342/372, 373, 368, 382, 354; 455/129, 561, 562

[56] References Cited

U.S. PATENT DOCUMENTS

| | | | |
|---|---|---|---|
| 4,211,894 | 7/1980 | Watanabe et al. | 455/562 |
| 4,704,734 | 11/1987 | Menich et al. | 455/562 |
| 4,901,085 | 2/1990 | Spring et al. | 342/373 |
| 4,907,004 | 3/1990 | Zacharatos et al. | 342/373 |
| 5,151,706 | 9/1992 | Roederer | 342/372 |
| 5,603,089 | 2/1997 | Searle et al. | 455/562 |

OTHER PUBLICATIONS

Egami et al., "An Adaptive Multiple Beam System Concept"; Journal on Selected Areas in Communications vol. 5 No. 4, May 1987.

*Primary Examiner*—Chau Nguyen
*Attorney, Agent, or Firm*—Mario J. Donato, Jr.; Richard A. Sonnentag

[57] ABSTRACT

A transmitter (300) is utilized to provide wireless communication in a sectorized coverage area. The transmitter (300) incorporates a hybrid matrix (303) and an inverse hybrid matrix (306) to combine input control signals (315) and traffic signals (316). The hybrid matrix (303) transforms the control signals (315) and traffic signals (316) into output signals which each contain a portion of the control signals (315) and traffic signals (316). The outputs from the hybrid matrix (303) are amplified by amplifiers (319), and the outputs from the amplifiers (319) are then inverse transformed by the inverse hybrid matrix (306). The inverse transform matrix (306) recombines the portions of the control signals (315) and traffic signals (316) originally input to the hybrid matrix (303), and the resulting signals are transmitted to mobile stations (203–205 and 208) in sectorized coverage areas ($S1_A$ and $S1_B$) using sector antennas (320).

11 Claims, 3 Drawing Sheets

APPARATUS AND METHODS FOR PROVIDING WIRELESS COMMUNICATION TO A SECTORIZED COVERAGE AREA

FIELD OF THE INVENTION

The present invention relates, in general, to communication systems and, more particularly, to an apparatus and method for providing wireless communication to a sectorized coverage area in a wireless communication system.

BACKGROUND OF THE INVENTION

Presently, in wireless communications systems, such as a Code Division Multiple Access (CDMA) communication system, a design such as that shown in FIG. 1 is used. In FIG. 1, the prior art transmit portion 101 used to support a three sector S1–S3 configuration is shown. The transmit portion 101 (shown for sector S1) consists of a radio channel unit 102 coupled to an amplifier 104, which in turn is coupled to an antenna 105. A voice/data signal 100 is transferred to the radio channel unit 102 from a public switched telephone network (PSTN). The radio channel unit 102 processes the voice/data signal 100 to produce a CDMA signal 103 as is well known in the art. The CDMA signal 103 is input into the amplifier 104 which amplifies the CDMA signal 103, and transmits the amplified CDMA signal to a mobile station (not shown in FIG. 1). This transmit portion 101 is replicated for each of the sectors S2–S3 as shown in FIG. 1.

A prior art sectorized coverage area is shown in FIG. 2. As can be seen, a base-station 200 which incorporates the transmit portion 101 in sectors S1–S3 is implemented to provide forward link (base-station 200 to mobile stations) coverage to the sectors S1–S3. Likewise, a receiver (not shown) is implemented in the base-station 200 to receive reverse link (mobile stations to base-station 200) transmissions within the sectors S1–S3. In this scenario, the three sectors S1–S3 have their own dedicated control channels CCH$_1$–CCH$_3$. In CDMA communication systems, and especially those compatible with TIA/EIA/IS-95A, Mobile Station-Base-station Compatibility Standard for Dual Mode Wideband Spread Spectrum Cellular System, July 1993 (a copy of which is available from the Telecommunication Industry Association (TIA), 2001 Pennsylvania Ave., Washington, D.C., 20006), the control channels take the form of a signal including pilot/page/synchronization information.

As can be seen in FIG. 2, three mobile stations 203–205 are located in one half of sector S1 while another mobile station 208 is located in the other half of sector S1. Since CDMA communication systems are interference limited systems, that is to say the user capacity in a sector is limited by the total interference presented in that sector, the total interference generated by the communications between the base-station 200 and the mobile stations 203–205 and 208 effects the user capacity for sector S1, despite the substantial separation of the mobile stations. Interestingly, the amount of interference generated by transmissions by the mobile stations 203–205 and 208 is quite different than the amount of interference generated by transmissions by the base-station 200. Since the amount of interference in the forward link differs from that of the reverse link, the amount of forward link capacity accordingly differs from the reverse link capacity. This phenomena is known as forward/reverse link capacity imbalance.

The limiting link in the forward/reverse link capacity imbalance problem is the forward link. Stated differently, more mobile stations could typically be supported by the reverse link (interference in the reverse link is usually expressed as "noise rise") if more power from the power amplifiers in the base-station 200 were available. However, an increase in power in power amplifiers results in an increase in cost, complexity and maintenance of the power amplifiers. Thus, a need exists for an improved apparatus and method for providing wireless communication to a sectorized coverage area to mitigate the effects of the forward/reverse link capacity imbalance.

DETAILED DESCRIPTION OF THE PREFERRED EMBODIMENT

Figure 1:
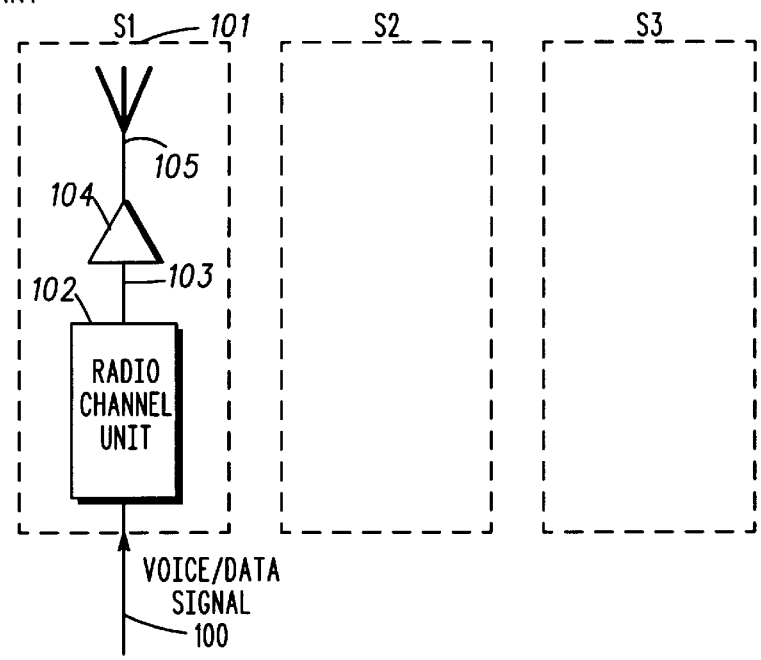
FIG. 1 is a block diagram of a prior art transmit portion used for wireless communication.

Stated generally, a transmitter is utilized to provide wireless communication in a sectorized coverage area. The transmitter incorporates a hybrid matrix and an inverse hybrid matrix to combine input control signals and traffic signals. The hybrid matrix transforms the control signals and traffic signals into output signals which each contain a portion of the control signals and traffic signals. The outputs from the hybrid matrix are amplified by amplifiers, and the outputs from the amplifiers are then inverse transformed by the inverse hybrid matrix. The inverse transform matrix recombines the portions of the control signals and traffic signals originally input to the hybrid matrix, and the resulting signals are transmitted to mobile stations in sectorized coverage areas using sector antennas.

Stated specifically, an apparatus for providing wireless communication to a sectorized coverage area in a wireless communication system comprises a means for generating control signals specific to each sector of the sectorized coverage area and a transform means, having as input the control signals and at least one traffic signal, for transforming the control signals and the at least one traffic signal into at least a first and a second transformed signals. The apparatus further comprises a plurality of amplifying means for amplifying the first and second transformed signals, and an inverse transform means for transforming the first and second transformed signals received from the plurality of amplifying means into the control signals and the at least one traffic signal for transmission to receiving stations within the sectorized coverage area.

In the preferred embodiment, the wireless communication system comprises a code division multiple access (CDMA) cellular communication system. The receiving stations may be either a mobile station or a stationary station, while the transform means may be either a Fourier Transform Matrix or a Butler Transform Matrix. The traffic signal comprises a voice/data signal processed to be compatible with the CDMA cellular communication system. In the preferred embodiment, each of the plurality of amplifying means comprise a wideband linear power amplifier. Also in the preferred embodiment, at least one control signal provides control for at least two sectors of the sectorized coverage area.

The apparatus in accordance with the invention is also configurable with a means for generating control signals for each sector of the sectorized coverage area and a signal routing means, having as input a plurality of traffic signals and a routing signal, for routing the traffic signals to appropriate radio channel units based on the routing signal. A transform means, having as input the control signals and the traffic signals output from the radio channel units, transforms the control signals and the traffic signals into at least a first and a second transformed signals, while a plurality of amplifying means amplifies the first and second transformed signals. An inverse transform means transforms the first and second transformed signals received from the plurality of amplifying means into the control signals and the traffic signals for transmission to receiving stations within the sectorized coverage area.

In this embodiment, the receiving stations can also be a mobile station or a stationary station, and the routing signal includes information regarding the sector to which a traffic signal intended for a mobile station or a stationary station should be routed. In the case of the receiving station being a mobile station, the information regarding the sector to which a traffic signal intended for the mobile station should be routed is derived from a location estimate of the mobile station. In the case of the receiving station being a stationary station, the information regarding the sector to which a traffic signal intended for the stationary station should be routed is derived from apriori knowledge of the location of the stationary station.

Figure 3:
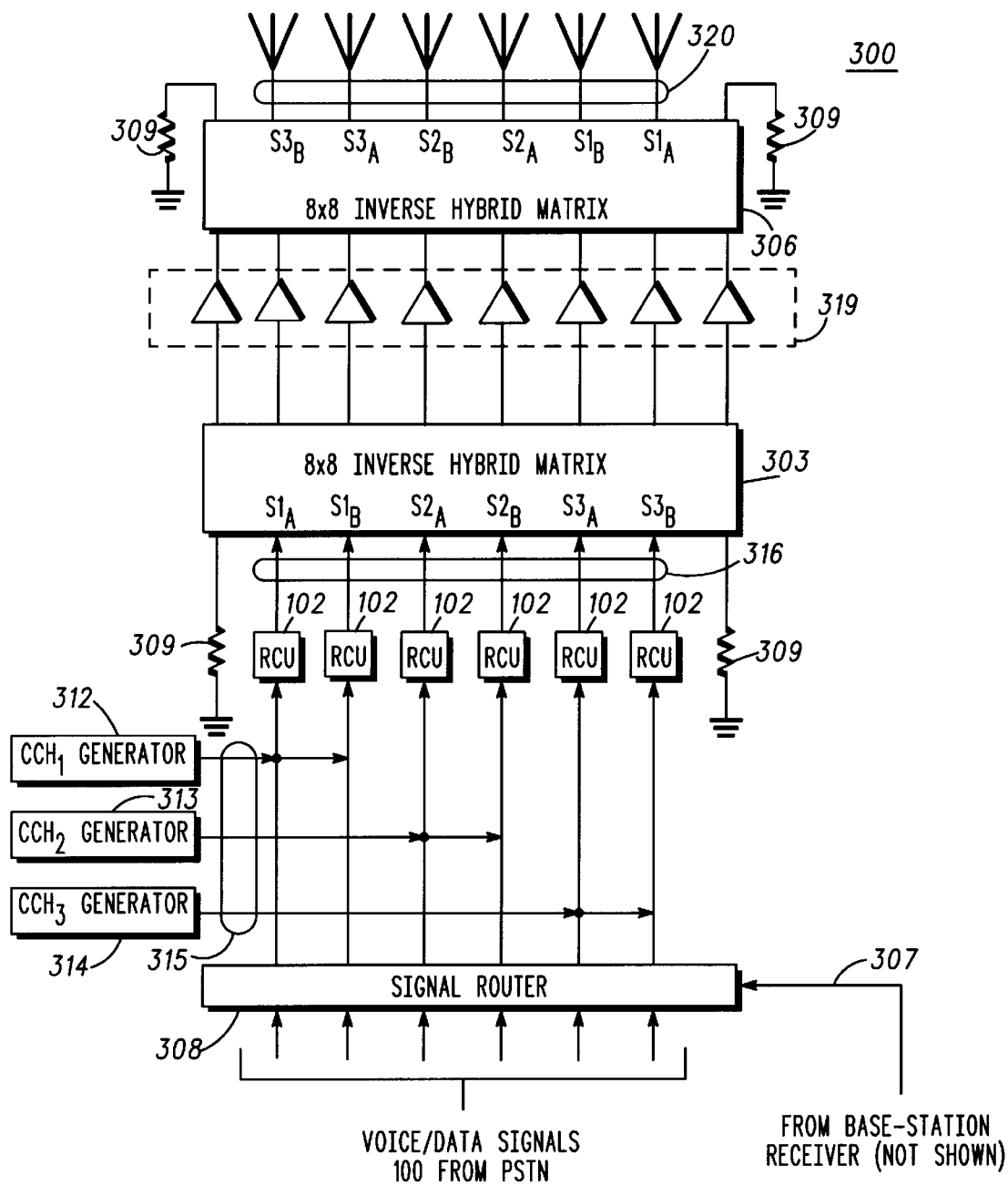
FIG. 3 generally depicts, in block diagram form, a transmitter of a base-station designed to implement the present invention.

FIG. 3 is a block diagram of an improved apparatus for providing wireless communication to a sectorized coverage area in accordance with the invention. As shown in FIG. 3, a hybrid matrix 303 and an inverse hybrid matrix 306 are implemented in this preferred embodiment. For more information on hybrid matrices, reference is made to U.S. Pat. No. 4,213,132 to Davidson, assigned to the assignee of the present invention, and herein incorporated by reference.

Figure 4:
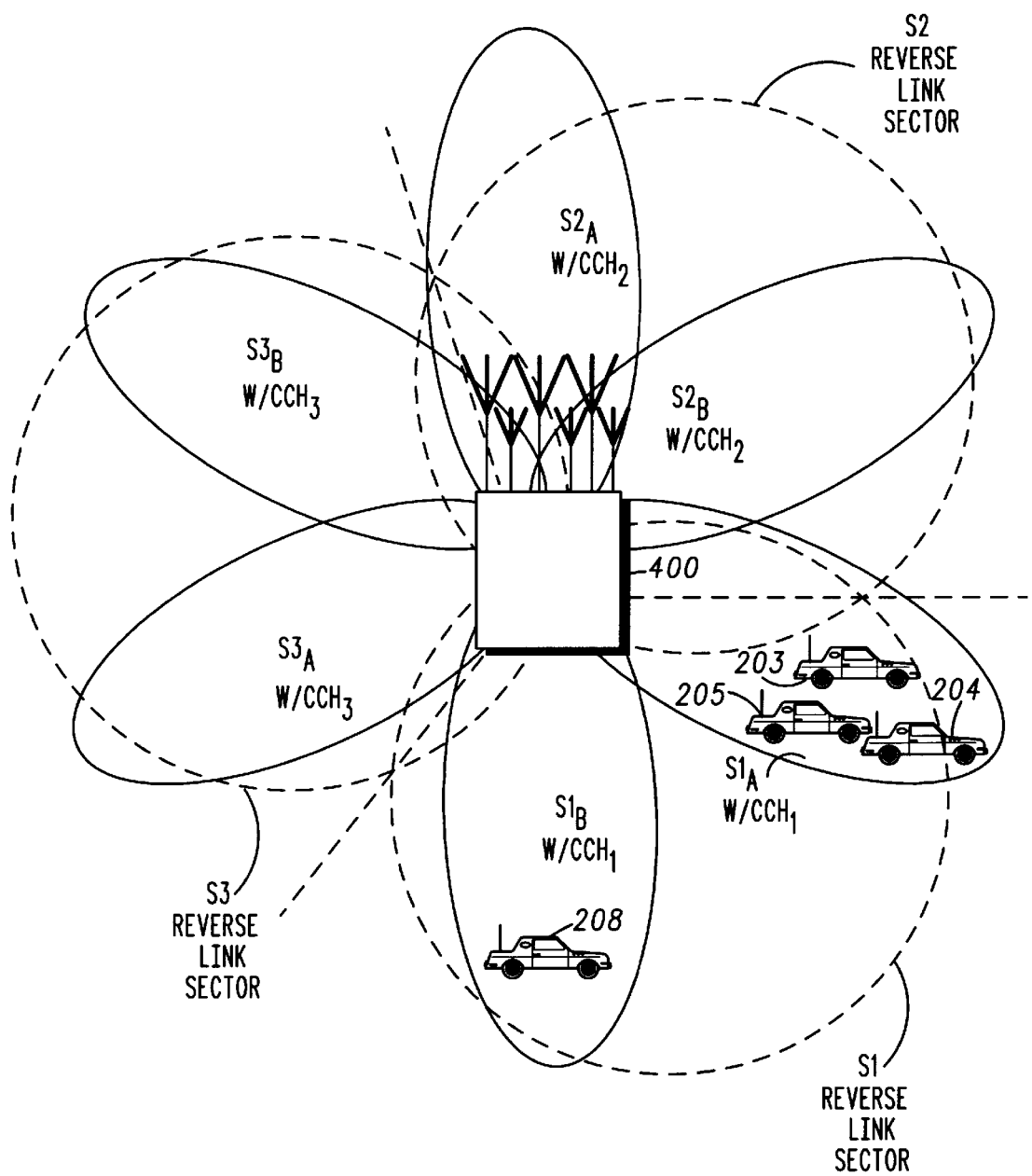
FIG. 4 generally depicts wireless communication provided to a sectorized coverage area by the transmitter of FIG. 3.

Referring to FIG. 3, the radio channel units 102 of FIG. 1 have their outputs entering an 8×8 hybrid matrix 303. In the preferred embodiment, the hybrid matrix 303 and the inverse hybrid matrix 306 are of the Fourier Transform type. As one of ordinary skill in the art will appreciate other types of hybrid matrices, such as a Butler matrix, may be beneficially employed. In the configuration depicted in FIG. 3, the 8×8 Fourier Transform Matrix is used to provide wireless communication to three sectors S1–S3, which are each further sub-sectorized into two sub-sectors A/B. The resulting sectors are $S1_A$, $S1_B$, $S2_A$, $S2_B$, $S3_A$ and $S3_B$ which is illustrated in FIG. 4. Since only six ports of the matrix 303 and the inverse matrix 306 are used, the unused ports of the matrix 303 and the inverse matrix 306 are terminated by loads 309.

Also shown in FIG. 3 are control channel (CCH) generators 312–314 which provide a means for generating control channels $CCH_1$–$CCH_3$ (315) respectively. While logically shown separately from their corresponding RCU 102 for illustrative purposes, each of the CCH generators 312–314 actually reside within their corresponding RCU 102. The CCH generators 312–314 generate the required control channel information in the form of a signal including pilot/page/synchronization information for their corresponding sector (e.g., $CCH_1$ for sector S1, etc.). This pilot/page/synchronization information is used by mobile stations within the sector to establish/maintain wireless communication within the sector, handoff to other sectors/cells, etc.

As shown in FIG. 3, the hybrid matrix 303 has as input control signals 315 and traffic signals 316 intended for mobile stations in the three sectors S1–S3. In the preferred embodiment, traffic signals 316 are CDMA signals compatible with the air-interface defined in TIA/EIA/IS-95A mentioned above. The hybrid matrix 303 transforms the control signals 315 and traffic signals 316 into output signals that each contain a portion of the control signals 315 and traffic signals 316. The outputs from the hybrid matrix 303 are amplified by amplifiers 319. In the preferred embodiment, the amplifiers 319 are wideband linear power amplifiers, but one of ordinary skill in the art will appreciate that multi-tone wideband linear power amplifiers can be beneficially implemented without departing from the spirit and scope of the invention.

The outputs from the amplifiers 319 are then inverse transformed by an inverse hybrid matrix 306. The inverse transform matrix recombines the portions of the control signals 315 and the traffic signals 316 originally input to the hybrid matrix 303. The resulting signals are transmitted to their corresponding sector $S1_A$, $S1_B$, $S2_A$, $S2_B$, $S3_A$ or $S3_B$ using sector antennas 320.

As can be seen in FIG. 4, and with reference to the particular embodiment described in FIG. 3, two transmit sectors $S1_A$ and $S1_B$ cover substantially the same amount of area as the reverse link sector S1. Stated differently, in this embodiment, the forward link is a six sector configuration while the reverse link is a three sector configuration. In this embodiment, as depicted in FIG. 4, the amount of interference presented to transmit sector $S1_B$ by mobile stations 203–205 is negligible since the forward link communications to mobile stations 203–205 are not transmitted in sector $S1_B$. To accomplish this, a location estimate of the mobile stations 203–205 and 208 must first be performed.

The requirement for a location estimate of mobile stations 203–205 and 208 arises from the fact the reverse link remains in a three sector configuration while the forward link is a six (or N) sector configuration. If a mobile station 203–205 and 208 originates a communication into base-station 400 without location estimation being performed at the base-station 400, the best location estimate that the base-station 400 would be able to derive would be that the mobile stations 203–205 and 208 are in the sector defined by S1 (which includes the two forward link sectors $S1_A$ and $S1_B$). Accordingly, to establish a communication with the mobile stations 203–205 and 208 the base-station would require the forward link communications for each of the mobile stations 203–205 and 208 to be transmitted on each of the sector antennas 320 corresponding to forward link sectors $S1_A$ and $S1_B$. As a result, the forward link communication for sector $S1_A$ unnecessarily includes the forward link communication for mobile station 208 and the forward link communication for sector $S1_B$ unnecessarily includes forward link communications for mobile stations 203–205.

To obtain a location estimate of the mobile stations 203–205 and 208, a global positioning system (GPS) receiver located in the mobile stations 203–205 and 208 is implemented. The GPS receiver in the mobile station 203–205 and 208 monitors location information transmitted by GPS satellites, and reports it's location to the base-station 400. GPS, however, has limited effectiveness in buildings, underground parking structures, etc. To overcome the limitations of GPS, a location method as disclosed in U.S. Pat. No. 5,508,709 to Ghosh et al., assigned to the assignee of the present application, and incorporated herein by reference, can likewise be employed. As one skilled in the art will appreciate, a combination of the two well known techniques could be employed in still another embodiment. Still other methods of location estimation can be beneficially implemented without departing from the spirit and scope of the invention.

With a location estimate of the mobile stations 203–205 and 208 now in place, the base-station receiver (not shown) forwards a routing signal 307 to the signal router 308. The routing signal 307 includes information which instructs the signal router 308 how to route incoming signals intended for either mobile stations 203–205 or mobile station 208 to the appropriate radio channel unit 102 serving forward link sector $S1_A$ and $S1_B$ respectively. In this manner, the voice/data signals 100 intended for the mobile stations 203–205 in sector $S1_A$ and mobile station 208 in sector $S1_B$ are properly routed to the appropriate radio channel unit 102. As a result, the forward link communication to the mobile stations 203–205 are only transmitted via the sector antenna 320 servicing the forward link sector $S1_B$, while the forward link communication for mobile station 208 is only transmitted via the sector antenna 320 servicing the forward link sector $S1_B$. In this manner, no unnecessary interference is presented in either of the forward link sectors $S1_A$ or $S1_B$. Since the amount of interference is reduced per sector, the forward link capacity increases to match that of the reverse link capacity. In this manner, the forward/reverse link capacity and balance problem is mitigated in accordance with the invention.

Figure 2:
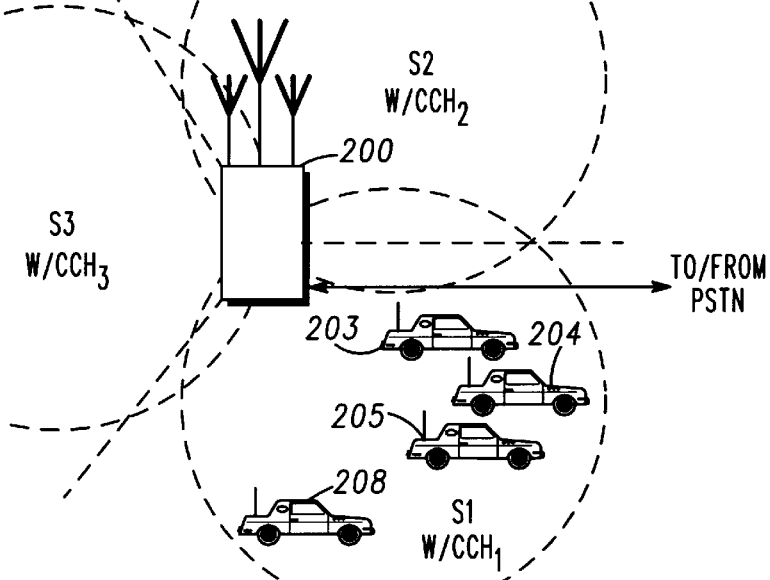
FIG. 2 generally illustrates a prior art sectorized coverage area.

The implementation depicted in FIG. 3 offers other advantages. First, by implementing the hybrid matrix 303 and the inverse hybrid matrix 306, catastrophic failure to a component in any one chain of any one sector $S1_A$, $S1_B$, $S2_A$, $S2_B$, $S3_A$ and $S3_B$ is avoided since the hybrid matrix 303 and the inverse hybrid matrix 306 distribute the power equally to the sector antennas 320. Also, with reference to FIG. 2 and FIG. 4, the interference effects described above are eliminated since mobile stations 203–205 and mobile station 208 communicate to base-station 300 in separate sub-sectors; that is, mobile stations 203–205 communicate within sub-sector $S1_A$ w/$CCH_1$ while mobile station 208 communicates on sub-sector $S1_B$ w/$CCH_1$. Furthermore, the configuration of FIG. 3 requires half of the CCH generators 312–314 compared to a six sector transmit implementation.

Important to note is that the configuration of FIG. 3 and FIG. 4 can be utilized for wireless local loop applications. In wireless local loop applications, the mobile stations 203–205 and 208 are not mobile, but are actually stationary stations connected to stationary buildings (such as houses, apartment complexes, etc.). The location of such stationary stations is known apriori to transmission of their intended traffic signals 316, thus the base-station 400 includes a list which corresponds the known locations of the stationary stations to the appropriate forward link sector. As stationary stations are added to the coverage area corresponding to the appropriate forward link sector, the list is updated accordingly.

As one of ordinary skill in the art will appreciate, many different variations of FIG. 3 may be beneficially implemented to provide wireless communication to a sectorized coverage area in accordance with the invention. For example, instead of using an 8×8 hybrid matrix 303 and inverse hybrid matrix 306 for six sector operation, a 16×16 hybrid matrix could be implemented for either 12 or 16-sector forward link operation. In fact, any N X N hybrid matrix can be beneficially employed to implement N-sector (or less) wireless communication in accordance with the invention.

While the invention has been particularly shown and described with reference to a particular embodiment, it will be understood by those skilled in the art that various changes in form and details may be made therein without departing from the spirit and scope of the invention. The corresponding structures, materials, acts and equivalents of all means or step plus function elements in the claims below are intended to include any structure, material, or acts for performing the functions in combination with other claimed elements as specifically claimed.

What I claim is:

1. A method of providing wireless communication to a sectorized coverage area in a wireless communication system, the method comprising the steps of:

generating control signals specific to each sector of the sectorized coverage area;

routing at least one traffic signal to appropriate radio channel units based on a routing signal which includes information regarding the sector to which a traffic signal intended for a mobile receiving station on a stationary receiving station should be routed;

transforming, via a matrix, the control signals and the at least one traffic signal into at least a first and a second transformed signals;

amplifying the first and second transformed signals; and transforming the amplified first and second transformed signals into the control signals and the at least one traffic signal representing those input into the matrix for transmission to either the mobile receiving station or the stationary receiving station within the sectorized coverage area.

2. The method of claim 1, wherein the wireless communication system further comprises a code division multiple access (CDMA) cellular communication system.

3. The method of claim 1, wherein the at least one traffic signal is a voice/data signal.

4. An apparatus for providing wireless communication to a sectorized coverage area in a wireless communication system, the apparatus comprising:

means for generating control signals for each sector of the sectorized coverage area;

signal routing means, having as input a plurality of traffic signals and a routing signal, for routing the traffic signals to appropriate radio channel units based on a routing signal which includes information regarding the sector to which a traffic signal intended for a mobile receiving station or a stationary receiving station should be routed;

transform means, having as input the control signals and the traffic signals output from the radio channel units, for transforming the control signals and the traffic signals into at least a first and a second transformed signals;

a plurality of amplifying means for amplifying the first and second transformed signals; and inverse transform means for transforming said first and second transformed signals received from the plurality of amplifying means into the control signals and the traffic signals representing those input into the transform means for transmission to either the mobile receiving station or the stationary receiving station within the sectorized coverage area.

5. The apparatus of claim 4, wherein the wireless communication system further comprises a code division multiple access (CDMA) cellular communication system.

6. The apparatus of claim 4, wherein the traffic signals further comprise voice/data signals.

7. The apparatus of claim 4, wherein each of the plurality of amplifying means further comprise a wideband linear power amplifier.

8. The apparatus of claim 4, wherein at least one control signal provides control for at least two sectors of the sectorized coverage area.

9. The apparatus of claim 4, wherein the information regarding the sector to which a traffic signal intended for a mobile station or a stationary station should be routed is derived from a location estimate of the mobile station.

10. The apparatus of claim 4, wherein the information regarding the sector to which a traffic signal intended for a mobile station or a stationary station should be routed is derived from apriori knowledge of the location of a stationary station.

11. The apparatus of claim 4, wherein the transform means further comprises a Fourier Transform Matrix or a Butler Transform Matrix.

* * * * *